UNITED STATES PATENT OFFICE.

HIRAM B. WARE, OF FORT SCOTT, KANSAS.

COMPOSITION FOR DEGUMMING FLAX-STRAW.

SPECIFICATION forming part of Letters Patent No. 517,905, dated April 10, 1894.

Application filed May 27, 1893. Serial No. 475,682. (No specimens.)

*To all whom it may concern:*

Be it known that I, HIRAM B. WARE, a citizen of the United States, residing at Fort Scott, Bourbon county, Kansas, have invented a new and useful Composition for Degumming Flax-Straw, of which the following is a specification.

My composition consists of the following ingredients combined in the proportions stated, viz:—pure water, one thousand gallons; potash of commerce, pure, sixteen pounds; kerosene, six gallons, 150°; glycerine, one gallon. Thoroughly dissolve the potash in the water at a boiling temperature and incorporate by agitation the kerosene and glycerine, they having been previously well mingled together.

The process of using said composition is as follows, viz: I put five hundred pounds of flax straw into a tank and then pour the above described fluid into the tank until the straw is entirely submerged in the fluid. I then keep the fluid at a gentle boil of 212° Fahrenheit, for four hours; that dissolves seventy five per cent. of the gum in the straw and brings it out into the liquid. I then draw off the liquid into a separate tank. I then take the straw from the tank and dry it thoroughly in dry house or open air as desired. When dry I run the straw through a break that separates the woody substance from the fiber and prepares it to receive the second treatment, and remove the remaining twenty five per cent. of the gum left. The breaking gives the liquid a better opportunity to act upon the fiber and remove the gum. I then take the fiber from the break and put it into the same tank and submerge it in the same composition or liquid as above given and keep it at a boiling heat three hours. I then draw off the liquid from the tank and wash the fiber with clean warm water at 150° Fahrenheit. The fiber is then taken from the tank to a dry house or open air to dry. The fiber when dry is then ready for scutching and finishing.

The boiling is done in open or closed tanks. I have used both. The closed tank is the most economical and convenient. To use the liquid at boiling heat 212° Fahrenheit, it gives the best and sure results.

The whole process of degumming and finishing the fiber suitable for the manufacture is completed in twenty four hours. The composition and process is entirely directed against the gummy substance in the straw. The gum is softened and dissolved by the fluid, separates from the fiber, coagulates and settles to the bottom of the tank and is easily removed and saved. The object is not to make paper or pulp but to separate the gum from the straw and leave the fiber sound, strong and uninjured for spinning and other purposes, bleaching and separation of the gum from the fiber results from the process but it is only incidental to the removal of the gum, which is thirty two per cent. of the gross weight of the straw, as when the gum is removed the fiber is left a clear silver white.

What I claim for my invention, and for which I wish to obtain a patent, is—

The composition of matter herein described to be used for degumming flax straw; said composition consisting of water, potash, kerosene and glycerine substantially as described.

HIRAM B. WARE.

Witnesses:
E. F. WARE,
C. W. PENNIMAN.